United States Patent
Chen

(10) Patent No.: US 7,646,189 B2
(45) Date of Patent: Jan. 12, 2010

(54) POWER SUPPLY CONTROLLER AND METHOD THEREFOR

(75) Inventor: Gang Chen, Hong Kong (CN)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 160 days.

(21) Appl. No.: 11/930,933

(22) Filed: Oct. 31, 2007

(65) Prior Publication Data

US 2009/0108824 A1    Apr. 30, 2009

(51) Int. Cl.
*G05F 1/00* (2006.01)
(52) U.S. Cl. .................... 323/285; 323/283; 323/224
(58) Field of Classification Search ............... 323/283, 323/284, 285, 224
See application file for complete search history.

(56) References Cited

U.S. PATENT DOCUMENTS

| | | | |
|---|---|---|---|
| 5,003,454 A * | 3/1991 | Bruning | .................. 363/81 |
| 5,006,975 A | 4/1991 | Neufeld | |
| 5,481,178 A | 1/1996 | Wilcox et al. | |
| 6,580,258 B2 | 6/2003 | Wilcox et al. | |
| 6,680,604 B2 * | 1/2004 | Muratov et al. | .............. 323/285 |
| 6,756,771 B1 | 6/2004 | Ball et al. | |

OTHER PUBLICATIONS

Data Sheet, "Advanced Voltage Mode Pulse Width Modulator, UCC15701/2 USS25701/2 UCC35701/2", Unitrode Products from Texas Instruments, SLUS293C—Jan. 2000—Revised Jun. 2005, Copyright 2007, Texas Instruments Incorporated , 22 p. CC.
Data Sheet, "Single Ended Active Clamp/Reset PWM, UCC1580-1,-2,-3,-4 UCC2570-1, -2, -3, -4 UCC3580-1, -2,-3,-4", Texas Instruments, SLUS292D—Feb. 1999—Revised Feb. 2007, Copyright 2007, Texas Instruments Incorporated , 22 pp. 8.
"Dynamical Characterization of Input-Voltage-Feedforward-Controlled Buck Converter", Matti Karppanen et al., IEEE Transactions on Industrial Electronics, vol. 54, No. 2, Apr. 2007, 9 pgs.
Data Sheet "NCP5215 Dual Synchronous Buck Controller for Notebook Power System", Aug. 200—Rev. 1, Publication Order No. NCP5315/D, Copyright Semiconductor Components Industries, LLC, 2007, 21 pgs.

* cited by examiner

*Primary Examiner*—Shawn Riley
(74) *Attorney, Agent, or Firm*—Robert F. Hightower

(57) ABSTRACT

In one embodiment, a PWM controller uses the input power of a power system to regulate a duty cycle of a switching PWM signal.

17 Claims, 5 Drawing Sheets

US 7,646,189 B2

1

POWER SUPPLY CONTROLLER AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to form pulse width modulated (PWM) power supply controllers. PWM controllers generally were used in a power supply to regulate an output voltage to a desired value. In one configuration, the power supply controllers functioned as a voltage mode controller that used the value of the output voltage to form a closed loop regulation system. Some of these voltage mode controllers also incorporated voltage feed forward that utilized the value of the input voltage to assist in regulating the output voltage. One example of such a power supply controller was the UCC35701 that was supplied by Texas Instruments, Inc. of Dallas Tex. One problem was that these prior controllers only utilized the inductor current as a current limit in order to limit the maximum value of the current supplied to the inductor. Another problem was that oscillations or overshoots in the value of the output voltage may occur in response to transient conditions of the load current or transient conditions of the input voltage that was supplied to the power supply.

Accordingly, it is desirable to have a power supply controller which more accurately regulates the value of the output voltage in response to a change in the input voltage, in response to a change in the current required by the load, or in response to noise signals on the input voltage.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices,

2 a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
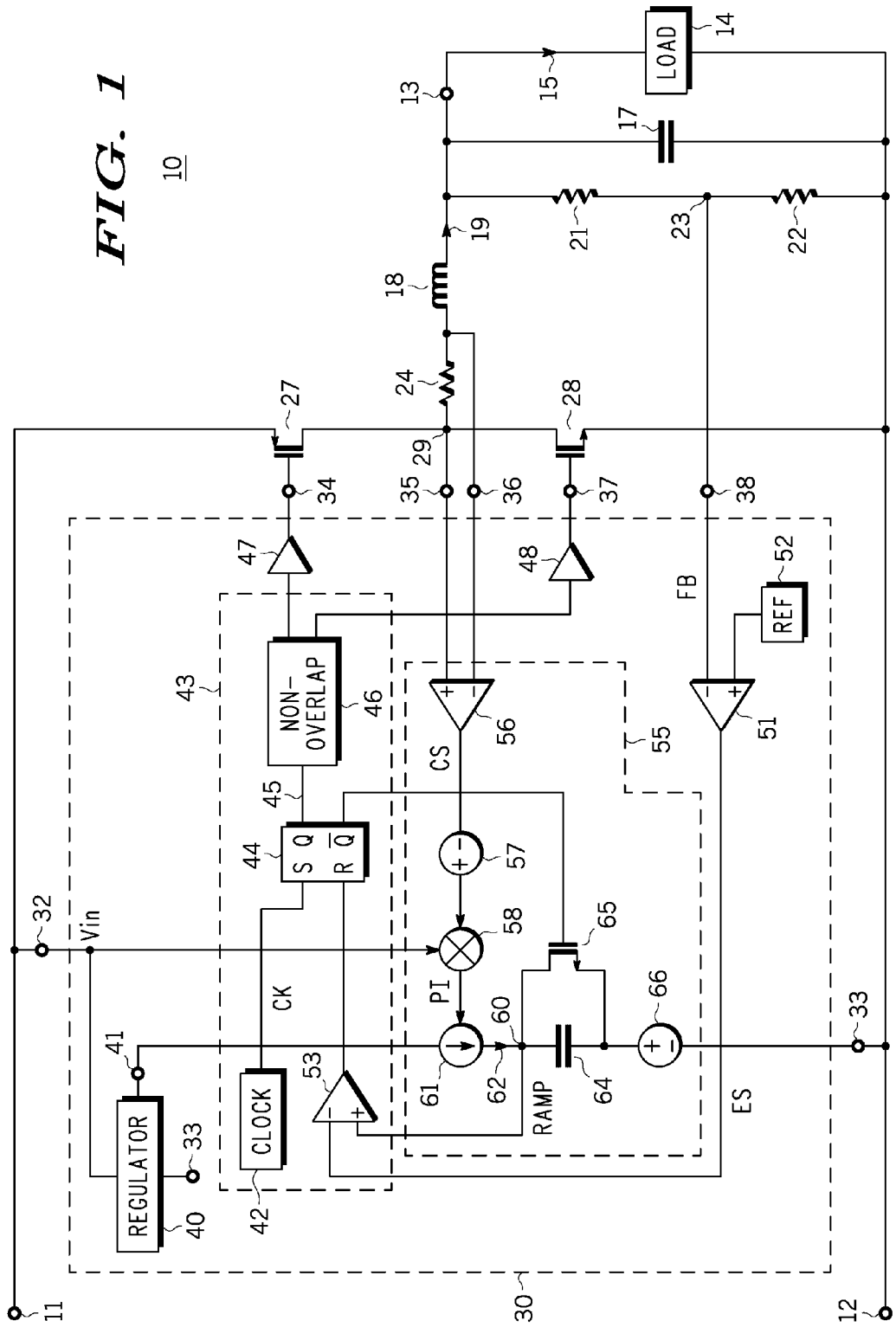
FIG. 1 schematically illustrates an embodiment of a portion of a power supply system that includes an exemplary embodiment of a power supply controller in accordance with the present invention.

FIG. 1 schematically illustrates an embodiment of a portion of a power supply system 10 that includes an exemplary embodiment of a power supply controller 30. System 10 receives input power, such as a rectified DC voltage, between an input terminal 11 and a return terminal 12 and forms an output voltage between an output terminal 13 and return terminal 12. A load 14 generally is connected between terminals 13 and 12 in order to receive the output voltage and a portion of an output current 19 from system 10. A storage capacitor 17 is used to assist in forming the output voltage. A feedback network includes a resistor 21 and resistor 22 connected in series between terminals 13 and 12 in order to form a feedback (FB) signal at a feedback node 23. The feedback (FB) signal is representative of the value of the output voltage. An energy storage inductor 18 is utilized to assist in supplying output current 19. A resistor 24 is utilized to form a sensing signal that is representative of the value of output current 19. As is well known to those skilled in the art, the sensing signal may be formed by means other than resistor 24. Power switches, such as transistors 27 and 28, are used to supply output current 19 and regulate the value of the output voltage. Controller 30 forms PWM drive signals that are used to control transistors 27 and 28 in order to assist in supplying current 19 and regulating the value of the output voltage.

Power supply controller 30 is configured to calculate an instantaneous value of the input power that is used by system 10 in order to supply the power required by load 14. The controller 30 is configured to use the instantaneous value of the input power regulate a duty cycle of the drive signals supplied to transistors 27 and 28. Controller 30 is configured to receive power for operating controller 30 between a voltage input 32 and a voltage return 33. Input 32 and return 33 generally are connected to respective terminals 11 and 12. Outputs 34 and 37 of controller 30 are used to provide first and second PWM drive signals that are used to control the operation of respective transistors 27 and 28. A feedback input 38 of controller 30 is connected to receive the feedback (FB) signal from node 23. Current sensing inputs 35 and 36 of controller 30 are connected across resistor 24 in order to receive the sensing signal that is representative of the value of current 19.

Controller 30 generally includes a PWM control circuit 43, a ramp generator circuit 55, and an error amplifier 51. Controller 30 also usually includes an internal voltage regulator 40 that is connected between input 32 and return 33 in order to form an internal operating voltage on an output 41. The internal operating voltage is used to provide operating power to operate elements of controller 30 such as error amplifier 51 and circuits 43 and 55. Error amplifier 51 receives the feedback (FB) signal and a substantially fixed reference signal from a reference 52 and responsively forms the error signal (ES) that is representative of the difference between the desired value of the output voltage and the actual instantaneous value of the output voltage. The desired value usually includes a target value within a range of values around the target value. For example, the target value may be five volts (5V) and the range of values may be plus or minus five percent (5%) around the five volts. PWM control circuit 43 includes a clock generator circuit or clock 42, a PWM comparator 53, a PWM latch 44, and a non-overlap circuit 46. As will be appreciated by those skilled in the art, non-overlap circuit 46 receives a PWM switching signal 45 from latch 44 and forms the first and second drive signals that are used to control transistors 27 and 28. Non-overlap circuit 46 ensures that the two drive signals do not simultaneously enable both transistors 27 and 28 in order to avoid short circuit currents through both transistors. Output buffers 47 and 48 are used to amplify the signals to ensure that controller 30 provides sufficient drive current for operating transistors 27 and 28. Clock 42 forms a clock (CK) signal that has a substantially fixed period.

Ramp generator circuit 55 includes a current sense amplifier 56 that receives the differential sensing signals from inputs 35 and 36 and forms a current sense (CS) signal that is representative of the value of output current 19. Circuit 55 also includes a multiplier 58, a variable current source 61, a ramp capacitor 64, and a discharge transistor 65. Circuit 55 also generally includes offsets 57 and 66 that provide offset voltages that assist in the operation of circuit 55. Circuit 55 forms a Ramp signal on an output 60 of circuit 55.

Figure 2:
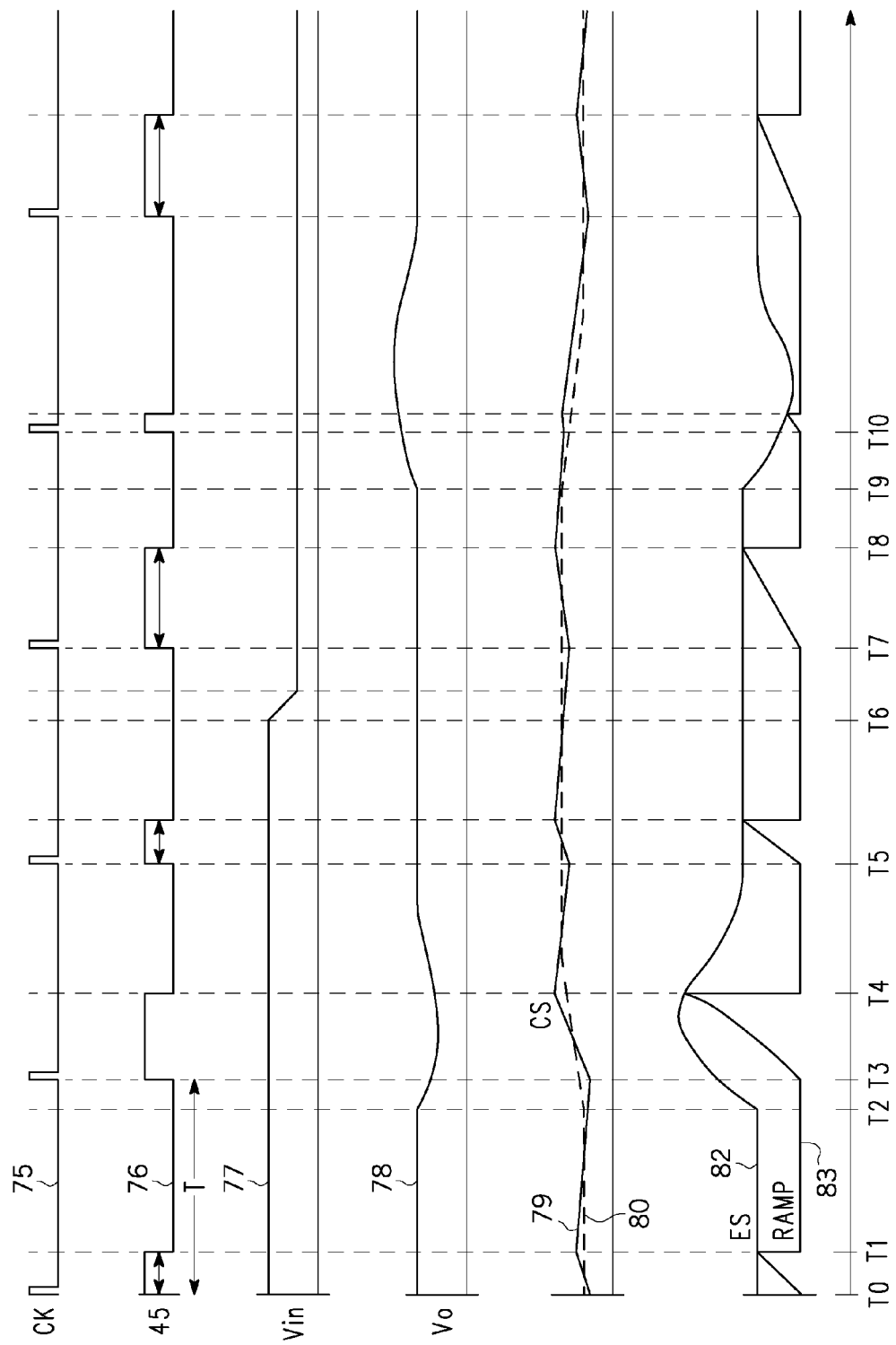
FIG. 2 is a graph having plots that illustrate some of the signals of the controller of FIG. 1 in accordance with the present invention.

FIG. 2 is a graph having plots that illustrate the value of some of the signals formed by controller 30. The abscissa indicates time and the ordinate indicates increasing value of the illustrated signal. A plot 75 represents the clock (CK) signal from clock 42. A plot 76 represents PWM switching signal 45. A plot 77 represents the value of the input voltage (Vin) received on input 32 relative to return 33. A plot 78 illustrates the output voltage (Vo) between terminal 13 and 12. A plot 79 illustrates the value of the current sense (CS) signal from amplifier 56, and a plot 80 illustrates in dashed lines the value of load current 15. A plot 82 illustrates the value of the error (ES) signal from error amplifier 51 and a plot 83 illustrates the ramp (Ramp) signal formed by ramp generator circuit 55. This description has references to FIG. 1 and FIG. 2.

In operation, clock 42 forms a substantially fixed clock (CK) signal having a substantially fixed period (T). As illustrated by plots 75 and 76, the rising edge of the CK signal sets latch 44 and asserts PWM switching signal 45. Asserting signal 45 enables transistor 27 to supply output current 19 in order to charge capacitor 17 and supply load current 15 to load 14. A portion of current 19 is used to charge capacitor 17 and another portion becomes load current 15. Multiplier 58 calculates the value of the input power used by system 10. Multiplier 58 receives a signal that is representative of the value of the input voltage (Vin) and receives the current sense (CS) signal from amplifier 56. The two signals are multiplied together by multiplier 58 to form a power input (PI) signal on output 59 of multiplier 58. Since output current 19 is representative of the input current from terminal 11, the value of the power input (PI) signal is an analog signal that is representative of the instantaneous value of the input power used by system 10. Thus, the value of the PI signal varies responsively to instantaneous variations in the value of the input voltage (Vin) and to instantiations variations in the value of the input current. Variable current source 61 forms a charging current 62 that is used to charge capacitor 64 and form the ramp (Ramp) signal illustrated by plot 83. Because source 61 is a variable current source, the value of current 62 changes responsively to the value of power input (PI) signal, thus, responsively to the value of the input power calculated by multiplier 58. Consequently, the slope or slew rate of the ramp signal changes as the value of the input power changes. If the input power increases, the PI signal increases which responsively increases the value of current 62 thereby more rapidly charging capacitor 64 and forming a steeper slope (higher slew rate) for the Ramp signal. Conversely, the slew rate of the Ramp signal decreases as the value of the input power decreases and decreases the value of the PI signal. Multiplier 58, source 61, and capacitor 64 form an integrator that integrates the value of the input power to form the Ramp signal. Integrating the input power calculates the input energy. Transistor 65 is enabled to discharge capacitor 64 when PWM switching signal 45 is negated. Therefore, circuit 55 only integrates the input power and calculates the input energy during the time interval that transistor 27 is enabled. Thus, the Ramp signal represents the input energy during one cycle of PWM switching signal 45. Since no input current can flow through transistor 27 when transistor 27 is disabled, integrating the input power while transistor 27 is enabled is representative of the total input energy. Comparator 53 receives the Ramp signal and the error (ES) signal and resets latch 44 when the value of the Ramp signal reaches the value of the ES signal. Resetting latch 44 negates signal 45 and sets the duty cycle of PWM switching signal 45. Because the Ramp signal varies responsively to the input power, the length of time that signal 45 is asserted, thus the duty cycle of PWM switching signal 45, also varies responsively to the input power. Offset 57 is a voltage that ensures that the minimum value of the CS signal received by multiplier 58 is greater than zero. Offset 66 is a voltage that ensures that the minimum value of the Ramp signal is greater than the minimum value of the ES signal. The value of offsets 57 and 66 generally is less than one volt and preferably is about 0.3 volts.

Controller 30 controls the duty cycle of the PWM switching signal responsively to the input power needed to supply the power required by load 14. Using the input power to control the duty cycle also controls the value of output current 19 responsively to the power required by load 14. As the power required by load 14 varies, the value of the output voltage, thus the value of the FB signal, changes in the opposite direction. For example, as the value of the power required by load 14 increases, the FB signal decreases. Using the input power to control the value of current 19 results in accurately regulating the value of the output voltage as the value of the input voltage varies. It also accurately controls the value of current 19 as the input voltage and the value of load current 15 changes.

Assume for example, that at a time T0 (FIG. 2) the CK signal goes high and sets latch 44 thereby asserting signal 45 and enabling transistor 27 to supply output current 19. Amplifier 56 forms the CS signal and multiplier 58 calculates the input power and responsively forms the power input (PI) signal. Current source 61 forms current 62 with a value that is controlled by the PI signal thereby forming the Ramp signal as illustrated by plot 83. When the value of the Ramp signal reaches the value of the ES signal, the output of comparator 53 goes high and resets latch 44 thereby negating signal 45 as illustrated at a time T1. Negating signal 45 forces the Q bar output of latch 44 high thereby enabling transistor 65 and discharging capacitor 64. Enabling transistor 65 forces the Ramp signal low as illustrated by plot 83. Latch 44 remains disabled until the CK signal again goes high as illustrated at a time T3. The time interval between T0 and T3 is the period of the CK signal and of signal 45. Between times T1 and T3, transistor 65 remains enabled and the Ramp signal remains low, however, multiplier 58 continues to generate the power input (PI) signal responsively to the input power. However, since transistor 65 is enabled, the integrator of multiplier 58, source 61, and capacitor 64 does not integrate the input power.

At a time T2, assume that load current 15 increases as illustrated by the dashed lines of plot 80. Because transistor 27 is disabled, the increased value of load current 15 is supplied by capacitor 17 which causes the output voltage to decrease. The decreased output voltage causes the error (ES) signal to increase as illustrated by plot 82 at time T2. At time T3, the CK signal again is asserted which sets latch 44 and asserts PWM switching signal 45 thereby enabling transistor 27 to again supply output current 19. Because load current 15 has increased and capacitor 17 has become discharged, the value of current 19 is larger than it was between times T0 and T1. Therefore, the value of the CS signal (plot 79) increases at time T3 which causes the value of the PI signal to increase. The increase in the PI signal increases the value of current 62 which increases the slew rate of the ramp signal as illustrated between time T3 and a time T4. The increased slew rate causes the Ramp signal to increase faster. As illustrated by the exponential shape of plot 83, the slew rate of the Ramp signal is changing because current 19 is increasing thereby causing an increase in the PI signal while the Ramp signal is being formed. Because the value of the error (ES) signal has increased, as illustrated by plot 82, the amplitude of the Ramp signal reaches a higher value before reaching the value of the error (ES) signal as illustrated at time T4. When the value of the Ramp signal reaches the value of the ES signal, the output of comparator 53 goes high which again resets latch 44 thereby negating signal 45 and forcing the Q bar output of latch 44 high. The high Q bar output enables transistor 65 which discharges capacitor 64 and forces the ramp signal low at time T4. Because of the time constant of the control loop, it generally takes more than one cycle for the output voltage to recover to the desired value, thus, it may take several cycles for the value of the output voltage to recover (such as an extra cycle illustrated at time T5).

Assume that at a time T6 the input voltage decreases. The decrease in the input voltage causes a corresponding decrease in the value of the PI signal. Because PWM switching signal 45 is negated, transistor 65 is enabled and the ramp signal remains low. At a time T7, the CK signal goes high and sets latch 44 to assert signal 45. Setting latch 44 forces the Q bar output low and disables transistor 65, consequently, source 61 supplies current 62 to charge capacitor 64 and begin forming the Ramp signal approximately at time T7. Because the value of the input voltage (Vin) has decreased, the value of the PI signal also decreases thereby decreasing the slew rate of the Ramp signal (relative to the prior Ramp signal). At a time T8, the value of the Ramp signal reaches the value of the error (ES) signal which forces the output of comparator 53 high. The high from comparator 53 resets latch 44 and negates PWM switching signal 45. Additionally, the Q bar output of latch 44 goes high and enables transistor 65. Enabling transistor 65 stops the integration of the input power by discharging capacitor 64 and forcing the Ramp signal low.

Assume that at a time T9, load current 15 decreases (plot 80) which causes a corresponding increase in the output voltage and a decrease in the error (ES) signal. Multiplier 58 calculates the changed input power and adjusts the value of the PI signal. Because latch 44 is reset, transistor 65 remains enabled and the Ramp signal remains at zero. At a time T10, the CK signal goes high to set latch 44 and assert PWM switching signal 45. Transistor 27 becomes enabled to supply current 19. The low Q bar output of latch 44 disables transistor 65 and initiates another Ramp signal. Because load current 15 is less than it was previously, the value of current 19 is also less thereby reducing the value of the current sense (CS) signal (plot 79). The decreased value of the CS signal reduces the value of the PI signal thereby causing current 62 to have a lower value. The lower value of current 62 charges capacitor 64 at a slower rate thereby decreasing the slew rate of the Ramp signal as illustrated after time T10. Because the value of the error (ES) signal has decreased (plot 82) the amplitude of the Ramp signal quickly reaches the value of the error (ES) signal as illustrated after time T10. When the value of the Ramp signal reaches the value of the ES signal, the output of comparator 53 goes high which again resets latch 44 thereby negating signal 45 and forcing the Q bar output of latch 44 high. The high Q bar output enables transistor 65 which discharges capacitor 64 and forces the Ramp signal low. The decreased slope of the Ramp signal and the decreased value of the ES signal results in a duty cycle that is formed responsively to the input power.

In order to facilitate this functionality for controller 30, regulator 40 is connected between input 32 and return 33. Output 41 of regulator 40 is connected to a first terminal of current source 61 which has a second terminal connected to output 60. A control input of current source 61 is connected to the output of multiplier 58 in order to receive the PI signal. A first input of multiplier 58 is connected to input 32 and a second input is connected to an output of offset 57. An input of offset 57 is connected to the output of amplifier 56. A non-inverting input of amplifier 56 is connected to input 35 and an inverting input of amplifier 56 is connected to input 36. A first terminal of capacitor 64 is commonly connected to a non-inverting input of comparator 53 and to a drain of transistor 65. A second terminal of capacitor 64 is commonly connected to a source of transistor 65 and a first terminal of offset 66 which has a second terminal connected to return 33. A non-inverting input of amplifier 51 is connected to the output of reference 52. An inverting input of amplifier 51 is connected to input 38. An output of amplifier 51 is connected to an inverting input of comparator 53 which has an output connected to the reset input of latch 44. The output of clock 42 is connected to the set input of latch 44. The Q output of latch 44 is connected to an input of non-overlap circuit 46 which has an output connected to an input of buffer 47. Another output of circuit 46 is connected to an input of buffer 48. An output of buffer 47 is connected to output 34 and an output of buffer 48 is connected output 37. The Q bar output of latch 44 is connected to the gate of transistor 65.

For clarity of the description, the operation of the preferred embodiment is explained, however, other embodiments will provide similar operation. For example, the sensing signal used to form the CS signal may be formed by sensing the value of the current flowing into the drain of transistor 27. For such an embodiment, resistor 24 may inserted between the drain of transistor 27 and input 32. Because capacitor 64 is only charged while transistor 27 is enabled, the value of such a sensing signal will form the same Ramp signal that is formed by the embodiment illustrated in FIG. 1.

In another alternate to the embodiment of FIG. 1, the input voltage may be sensed at a node 29 instead of at input 32. Because capacitor 64 is only charged while transistor 27 is enabled, the value of the voltage at node 29 is approximately the same voltage at input 32 while transistor 27 is enabled. Therefore, such a sensing signal will form the same Ramp signal that is formed by the embodiment illustrated in FIG. 1.

In yet another alternate to the embodiment of FIG. 1, the sensing signal used to form the CS signal may be formed by sensing the value of the current flowing into through transistor 28. For such an embodiment, resistor 24 may inserted between the source of transistor 28 and input 33. Because capacitor 64 is only charged while transistor 27 is enabled, the value of such a sensing signal will form the same Ramp signal that is formed by the embodiment illustrated in FIG. 1. Because controller 30 is integrating the power during the time that transistor 27 is enabled, the current through transistor 28 is zero at that time. Therefore, a sample and hold circuit (not shown) needs to be employed to hold the value of the CS signal at the point in a cycle that is just before transistor 27 is enabled. This stored value of the CS signal is used to as the value of the CS input that is supplied into multiplier 58 at the time that transistor 27 becomes enabled.

Figure 3:
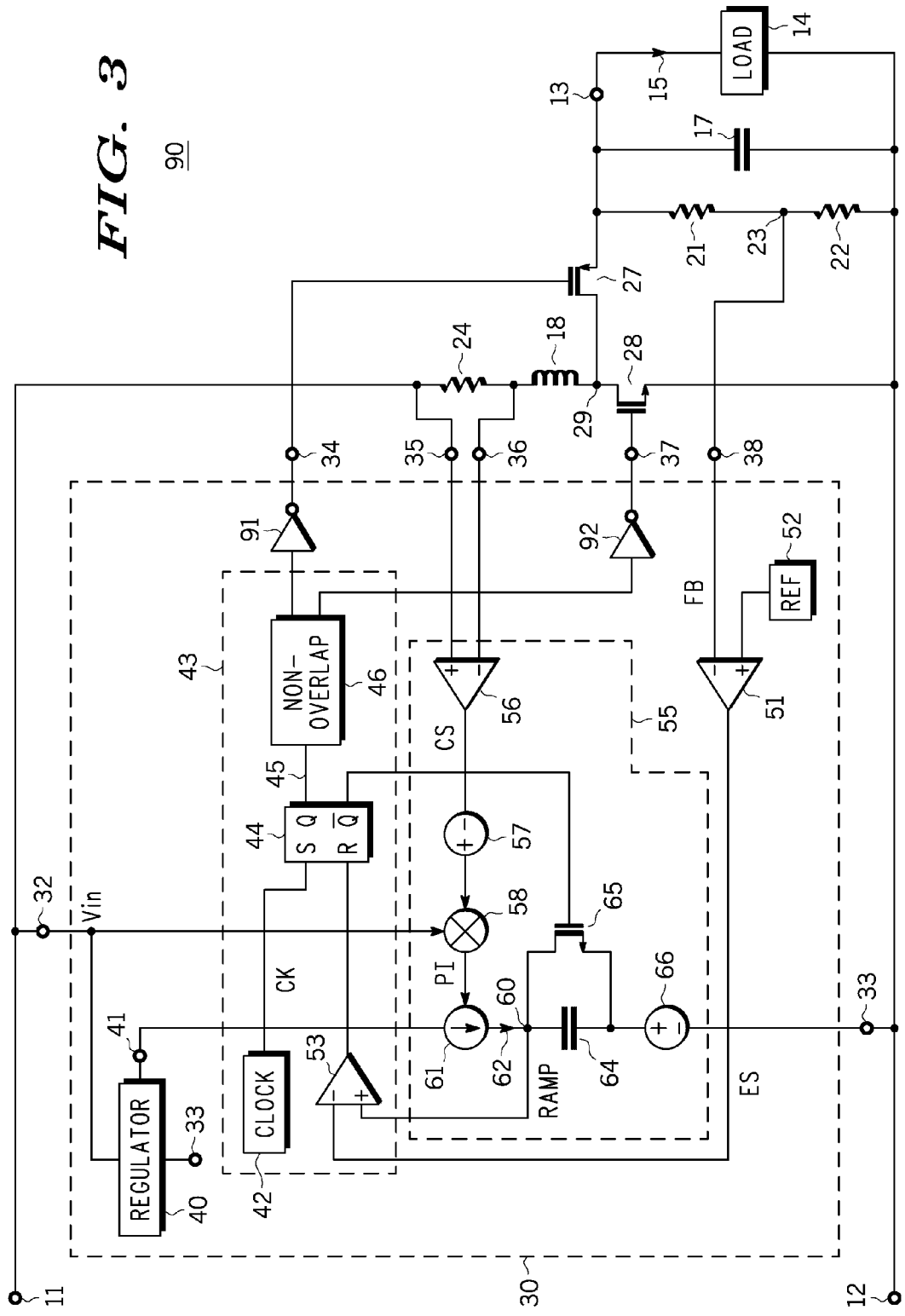
FIG. 3 schematically illustrates an embodiment of a portion of a power supply system that includes the power supply controller of FIG. 1 connected in an alternate embodiment of the system of FIG. 1 in accordance with the present invention.

FIG. 3 schematically illustrates an embodiment of a portion of a power supply system 90 that includes controller 30 that was described in the description of FIG. 1 and FIG. 2. System 90 uses controller 30 connected in a boost configuration instead of the buck configuration illustrated in FIG. 1. Buffers 47 and 48 are replaced by inverting drivers 91 and 92.

Figure 4:
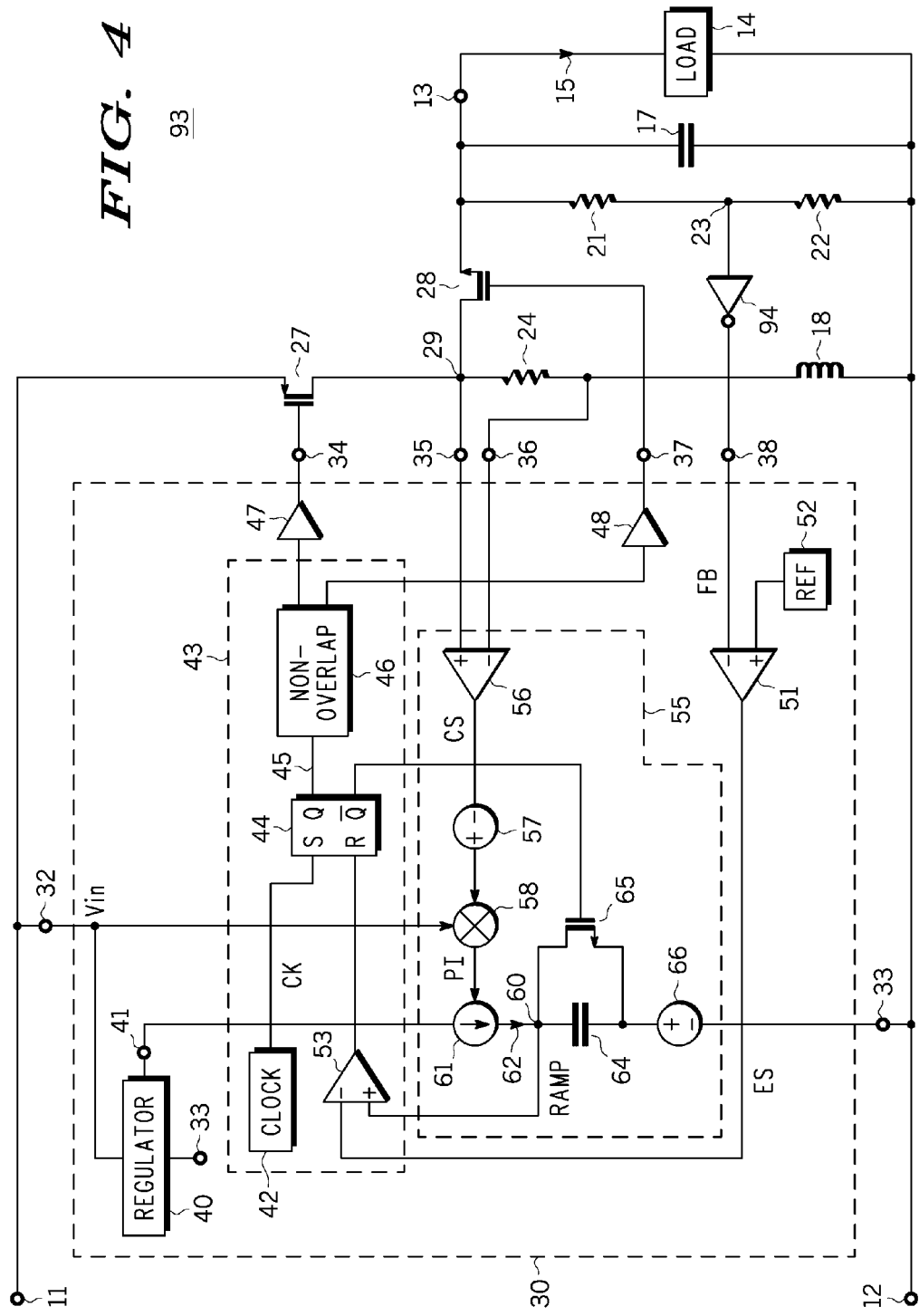
FIG. 4 schematically illustrates an embodiment of a portion of a power supply system that includes the power supply controller of FIG. 1 connected in another alternate embodiment of the system of FIG. 1 in accordance with the present invention.

FIG. 4 schematically illustrates an embodiment of a portion of a power supply system 93 that includes controller 30 that was described in the description of FIG. 1 and FIG. 2. System 93 uses controller 30 connected in a buck-boost configuration instead of the buck configuration illustrated in FIG. 1. In this configuration, the output voltage is negative, thus, an inverting analog buffer 94 is used to correct the FB signal to the voltage required for controller 30.

Figure 5:
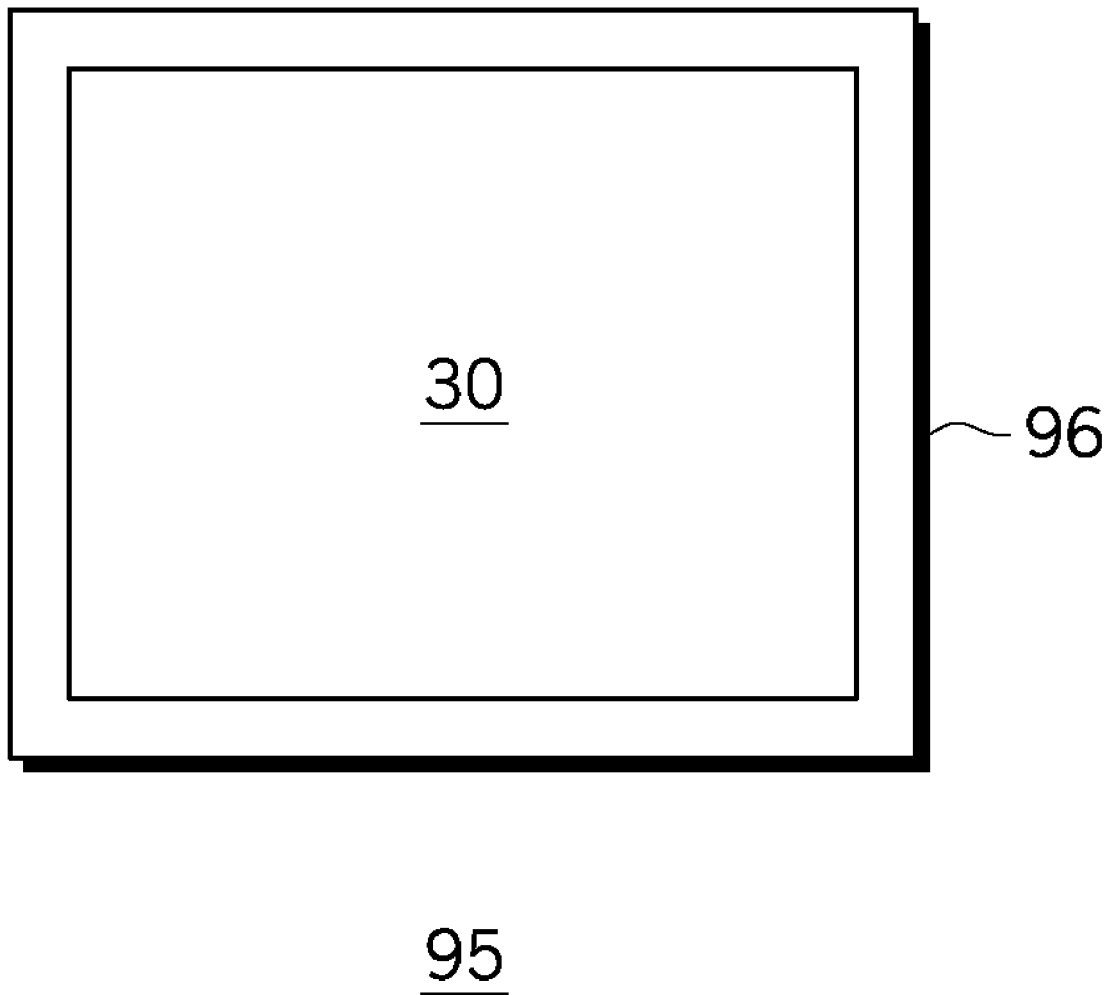
FIG. 5 schematically illustrates an enlarged plan view of a semiconductor device that includes the power supply controller of FIG. 1 in accordance with the present invention.

FIG. 5 schematically illustrates an enlarged plan view of a portion of an embodiment of a semiconductor device or integrated circuit 95 that is formed on a semiconductor die 96. Controller 30 is formed on die 96. Die 96 may also include other circuits that are not shown in FIG. 5 for simplicity of the drawing. Controller 30 and device or integrated circuit 95 are formed on die 96 by semiconductor manufacturing techniques that are well known to those skilled in the art.

In view of all of the above, it is evident that a novel device and method is disclosed. Included, among other features, is forming a PWM controller to regulate the duty cycle of the PWM switching signal responsively to the instantaneous input power used by the system. Using the instantaneous input power to regulate the duty cycle assists in quickly adjusting the amount of output power delivered in response to a change in the amount of power used by a load. As the amount of power used by the load changes, the input power also changes in a similar manner. Using the input power to regulate the slew rate of the Ramp signal results in changing the slew rate, thus the duty cycle, as the amount of power used by the load changes. Also, the integration of the power signal (PI) results in integrating the noise of the input voltage thereby reducing the sensitivity to noise on the input voltage.

While the subject matter of the invention is described with specific preferred embodiments, it is evident that many alternatives and variations will be apparent to those skilled in the semiconductor arts. The subject matter of the invention has been described for a particular MOS transistor structure, although the method is directly applicable to bipolar transistors, as well as to MOS, BiCMOS, metal semiconductor FETs (MESFETs), HFETs, and other transistor structures. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A PWM power supply controller for regulating an output voltage of a power supply, the PWM power supply controller comprising:
a clock circuit configured to form a clock signal having a period;
a PWM control circuit configured to receive the clock signal and form a PWM switching signal that is used to control a power switch to regulate an output voltage to a desired value, the PWM switching signal having the period;
a ramp generator circuit configured to form a ramp signal that is used to regulate a duty cycle of the PWM switching signal; and
a variable current source of the ramp generator circuit operably coupled to vary a value of a charging current formed by the variable current source responsively to an input power of the power supply, the ramp generator circuit configured to control an amplitude and a slope of the ramp signal responsively to the charging current.

2. The PWM power supply controller of claim 1 wherein the ramp generator circuit includes a multiplier coupled to calculate an instantaneous value of the input power of the power supply and use the instantaneous value of the input power to control the charging current.

3. The PWM power supply controller of claim 1 wherein the ramp generator circuit includes a capacitor coupled to receive the charging current and form the ramp signal.

4. The PWM power supply controller of claim 3 wherein the ramp generator circuit includes a transistor coupled in parallel with the capacitor and configured to discharge the capacitor responsively to the PWM switching signal being negated.

5. The PWM power supply controller of claim 1 wherein the clock signal has a substantially fixed frequency.

6. The PWM power supply controller of claim 1 further including the PWM power supply controller configured to receive form an error signal that is representative of a deviation of the output voltage from a desired value of the output voltage, and further including a comparator coupled to receive the ramp signal and the error signal and form a control signal that is used to control the duty cycle of the PWM switching signal.

7. The PWM power supply controller of claim 6 further including an error amplifier coupled to receive a feedback signal that is representative of the output voltage and responsively form the error signal.

8. A method of forming a power supply controller comprising:
configuring a ramp circuit of the power supply controller to form a first control signal that is representative of an instantaneous input power of a power supply;
configuring the ramp circuit to form a ramp signal and to vary an amplitude and slope of the ramp signal responsively to the first control signal;
configuring a PWM control circuit of the power supply controller to form a PWM switching signal that is used to control a power switch to regulate an output voltage of a power supply to a desired value wherein the PWM switching signal has a period that is substantially not controlled by the instantaneous input power; and
configuring the PWM control circuit to regulate a duty cycle of the PWM switching signal responsively to the ramp signal.

9. The method of claim 8 wherein configuring the power supply controller to form the PWM switching signal includes coupling an error amplifier to form an error signal that is representative of a deviation of the output voltage from a desired value of the output voltage and configuring a comparator to receive the ramp signal and the error signal and form a second control signal that is used to control a duty cycle of the PWM switching signal.

10. The method of claim 8 wherein configuring the ramp circuit of the power supply controller to form the first control signal includes coupling a multiplier to receive a first signal that is representative of an instantaneous value of an input voltage of the power supply, coupling the multiplier to receive a second signal that is representative of an instantaneous value of an input current of the power supply, and configuring the multiplier to multiply the first and second signals to form the first control signal.

11. The method of claim 10 wherein configuring the ramp circuit to form the ramp signal includes configuring a variable current source to receive the first control signal and responsively form a charging current having a value that varies linearly in response to the first control signal.

12. The method of claim 11 further including coupling the charging current to charge a capacitor wherein a voltage across the capacitor forms the ramp signal.

13. The method of claim 12 further including configuring the ramp circuit to discharge the capacitor responsively to negating the PWM switching signal.

14. A method of forming a power supply controller comprising:
configuring the power supply controller to form a PWM switching signal that is used to control a power switch to regulate an output voltage of a power supply to a desired value;
configuring the power supply controller to calculate an instantaneous value of an input power of the power supply;
configuring the power supply controller to form a ramp signal having an amplitude and slope that are varied responsively to the instantaneous value of the input power; and
configuring the power supply controller to use ramp signal to regulate a duty cycle of the PWM switching signal.

15. The method of claim 14 wherein configuring the power supply controller to calculate the instantaneous value of the input power includes coupling a multiplier to receive a first signal that is representative of an instantaneous value of an input voltage of the power supply, coupling the multiplier to receive a second signal that is representative of an instantaneous value of an input current of the power supply, and configuring the multiplier to multiply the first and second signals to form the instantaneous value.

16. The method of claim 15 further including coupling a variable current source to form a charging current having a value that varies responsively to the instantaneous value.

17. The method of claim 16 further including coupling the charging current to charge a capacitor wherein a voltage across the capacitor forms a ramp signal and using the ramp signal to regulate the duty cycle of the PWM switching signal.

* * * * *